United States Patent Office 3,714,797
Patented Feb. 6, 1973

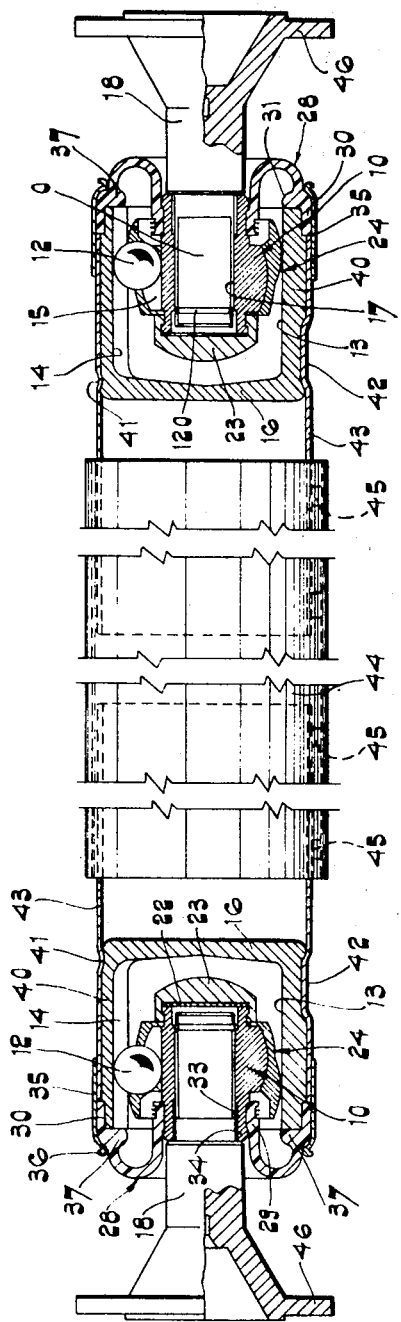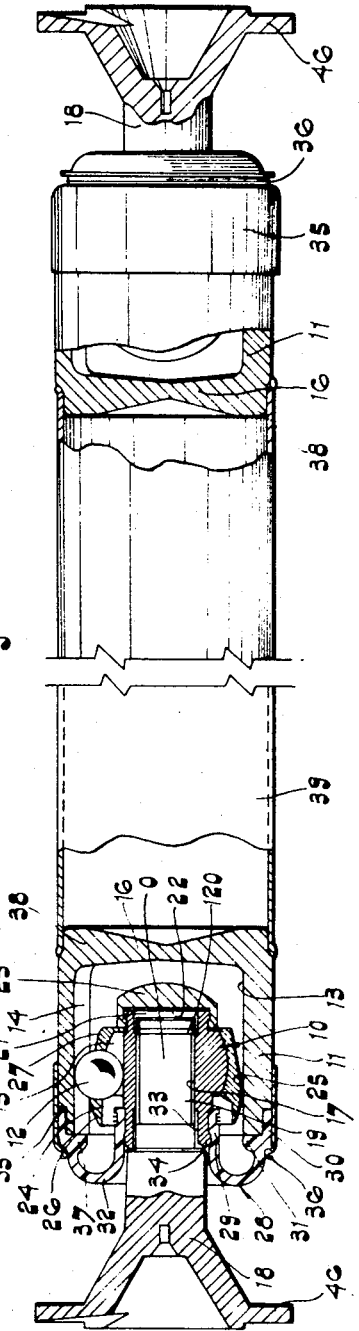

3,714,797
UNIVERSAL JOINTS
Leslie George Fisher, Birmingham, England, assignor to GKN Birfield Transmissions Limited, Birmingham, England
Filed Dec. 11, 1970, Ser. No. 97,381
Claims priority, application Great Britain, Dec. 11, 1969, 60,435/69, 60,436/69
Int. Cl. F16d 3/16
U.S. Cl. 64—8    11 Claims

ABSTRACT OF THE DISCLOSURE

A plunging constant velocity universal joint includes an inner member and an outer member with torque-transmitting balls therebetween and sealing means acts between the inner and outer members of the joint such that a lubricant-tight enclosure is defined around the balls and the sealing means includes a part which acts as a stop to limit plunging movement in one direction.

BACKGROUND OF THE INVENTION

Field of the invention

This invention relates to universal joints of the kind which include an outer member having a bore which receives an inner member and in which balls are located in grooves in the inner and outer members for the transmission of torque therebetween, the grooves being so shaped as to permit relative axial movement between the inner and outer members.

Description of the prior art

British patent specification No. 1,072,144 discloses a universal joint of the kind referred to above and in which sealing means are provided acting between the joint outer member and a shaft which has a splined engagement with the joint inner member.

U.S. specification No. 3,017,756 discloses a universal joint in which the inner member is fixed relative to the outer member and in which a seal is provided which is secured directly to the joint inner and outer members whereby, after assembly of the joint and its sealing means, the joint inner member can be connected to a drive shaft.

SUMMARY OF THE INVENTION

Closure means are provided closing one end of the bore in the outer member and sealing means is provided acting between the inner and outer members of the joint such that a lubricant-tight enclosure is defined by said inner and outer members, said closure means and said sealing means and the sealing means includes a part which acts as a stop to limit travel of the balls along the grooves and thus the extent of relative movement between the inner and outer members in one direction.

By arranging for the sealing means to act between the inner and outer members of the joint, as opposed to arranging it to act between the outer members and the driving or driven member to which, in use, the inner member is connected, one can provide a sealed joint assembly which is supplied with the appropriate amount of lubricant prior to it leaving the factory in which it is produced.

As one can move the inner member relative to the outer member one can provide a plug in connection arrangement for connection of the inner member to its associated driving or driven member such that one can connect a propeller shaft assembly including two such joints directly between a pinion shaft and a gearbox output shaft of a motor vehicle when the pinion shaft and gearbox output shaft are in position in the vehicle.

By arranging that the sealing means includes a part which acts as a stop to limit travel of the balls along the grooves, the extent of relative movement between the inner and outer members is limited in a simple and efficient manner which does not involve the use of additional travel limiting components.

BRIEF DESCRIPTION OF THE DRAWING

In the drawing:
FIG. 1 is a longitudinal view, partly in section, of a propeller shaft assembly including a propeller shaft tube and a pair of constant velocity universal joints, and
FIG. 2 is a longitudinal view, partly in section, of an alternative form of propeller shaft assembly, there being a tube secured to each universal joint with a further tube interconnecting said two tubes with elastomeric rings providing a driving connection between said further tube and said two tubes.

DESCRIPTION OF THE PREFERRED EMBODIMENTS

In the propeller shaft assembly shown in FIG. 1 only one of the universal joints has been shown in section but the unsectioned universal joint has the same construction as the joint shown in section.

The two universal joints shown in FIG. 2 have basically the same construction as the universal joint shown in section in FIG. 1.

Each universal joint includes an inner member 10 which is axially movable within the associated hollow generally cylindrical outer member 11 and is coupled thereto by a series of six equi-angularly spaced torque-transmitting balls 12. The sectioning of each joint is taken in different radial planes at either side of the joint axis so as to show, on the left-hand side of the joint axis a ball 12 and so as to show on the right-hand side of the joint axis the sectional form of the joint components between adjacent balls 12. The outer member 11 of each joint has a cylindrical bore 13 with longitudinally extending grooves 14 parallel to the rotational axis of the outer member 11 which coincides with the joint axis. The inner member 10 has a part-spherical outer surface which is machined to provide equi-angularly spaced straight grooves 15 which are parallel to the rotational axis of the inner member 10, which rotational axis coincides with the joint axis when the joint members are aligned as shown in the drawing. The grooves 14 and 15 in the two joint members 10 and 11 co-operate in pairs to provide ball tracks along which the balls 12 roll during relative rotational and axial movements between the joint members.

At its inner end the bore 13 in the outer member 11 is closed by an end wall 16 which, in the preferred form as shown in the drawing, is integral with the cylindrical wall portion of the outer member 11. In an alternative arrangement the end wall 16 may be constituted by an end closure member formed separate from the outer member as a metal pressing.

The inner member 10 is provided with a bore 17 which, over a portion of its length, is internally splined so that it can have a splined connection with a driving or driven shaft 18 which has an externally splined portion 19 arranged to have driving engagement with the splined portion of the bore 17. The splined portion 19 of the shaft 18 is formed with an annular groove in which a spring clip 120 is located and the spring clip is compressed as it passes through the splined portion of the bore 17 and then, when it reaches the inner end portion 21 of the bore 17, the clip 120 expands resiliently so as to hold the shaft 18 in engagement with the inner member 10.

As can be seen from the drawing the inner end portion 21 of the bore 17 of each inner member is of increased cross-section to accommodate the clip 120. The bore 17 in the inner member 10 is closed by an end plate 22 and a resilient pad 23 is fitted on the end plate 22 and includes a generally cylindrical portion having an inturned lip portion which seats in an annular groove formed in the inner end part of the inner member 10.

A ball cage 24 with apertures in which the balls 12 are closely received is positioned between the inner and outer members 10 and 11 of each joint and acts to centre the inner member 10 within the outer member 11. The cage 24 has an inner part-spherical surface which mates with a complementary part-spherical surface of the inner member 10 so that the cage 24 not only centres the inner member but is held captive thereon against axial movement relative thereto. The cage 24 has a part-spherical outer surface portion 25 which engages the cylindrical bore 13 of the outer member 10.

The inner cage surface has a centre of curvature which, with the inner and outer members axially aligned, is displaced from the joint centre O, i.e. the point at which the plane containing the centres of the balls 12 intersects the joint axis, towards the open end of the bore 17 in the inner member 10. The outer surface portion 25 of the cage 24 has a centre of curvature which is also disposed on the joint axis but is offset from the joint centre O by an equal amount in the opposite direction.

This offset centres arrangement ensures that, during joint articulation, the inner member in effect pivots about the centre of curvature of the inner cage surface and the outer member effectively pivots around the offset centre of the outer cage surface. As described in specification No. 1,072,144 this arrangement ensures that the plane containing the centres of the balls 12 will always be the true median plane of the joint.

The part-spherical outer surface portion 25 of the cage 24 need only subtend an angle of 10° at the joint centre O for a maximum joint working angle of about 20°. The adjacent outer surface portions 26 and 27 of the cage 24 can be of frusto-conical form and this arrangement allows the cage 24 to be of substantially stronger construction and thicker at its ends than if the outer surface thereof were completely part-spherical.

The frusto-conical surface 27 is arranged so that it engages the wall of the bore 13 at the maximum designed joint angle to provide a positive stop against the joint members being pivoted relative to each other beyond the designed joint angle.

The end of the cage 24 at which the outer surface portion 26 is formed is counterbored as shown and the diameter of the counterbore is such as to allow the inner member 10 to pass therethrough on assembly of the joint, assembly of the inner member and cage being as described in specification No. 1,072,144.

A sealing member 28 of generally annular form is secured to the inner and outer members of the joint and the sealing member 28 includes an inner generally cylindrical portion 29 having a radial end lip, an outer generally cylindrical portion 30 adjacent which there is a part 31 having a radially extending face and an arcuate portion 32 interconnecting said inner and outer generally cylindrical portions 29 and 30.

The inner member 10 of the joint includes a portion 33 onto which the generally cylindrical inner portion 29 of the sealing member is secured by means of a fastener and, adjacent portion 33, the inner member includes a portion 34 which is of increased cross-section compared with portion 33 and which is of arcuate form in longitudinal section. The sealing member 28 is originally formed so that the cylindrical inner portion 29 and the part of the sealing member adjacent thereto are in substantially the same plane and the increased diameter portion 34 of the inner member 10 thus serves to bias the engaged part of the sealing member 28 outwardly relative to the joint axis. In this way, when the joint is in use and axial movement takes place between the inner and outer members of the joint, the sealing member 28 will not tend to move inwardly into engagement with the shaft 18. When the shaft 18 and the joint are rotating at high speed, the part of the sealing member 28 nearest to the shaft 18 will be urged centrifugally outwardly relative to the shaft axis to prevent the sealing member 28 engaging the shaft 18 at high speed.

The outer generally cylindrical portion 30 of the sealing member 28 is secured to the outer member 11 of the joint by means of a retaining sleeve 35 which is formed as, for example, a metal pressing and includes a lip portion 36 which, on assembly of the joint, is pressed inwardly towards the adjacent end face of the outer member 11 so as to urge the radial face of the portion 31 of the sealing member 28 into engagement with the radial end face of the outer member 11. The outer member 11 of the joint may be provided, adjacent the end face thereof, with a circumferentially extending rib (not shown), which rib will assist in holding the sealing member 28 against movement relative to the outer member 11 and will also assist in improving the effectiveness of the seal.

The part 31 of the sealing member 28 having the radially extending face includes a projecting portion 37 which projects beyond the bases of the ball-receiving grooves 14 and said projecting portion 37 serves as a resilient end stop limiting the extent of axial movement of the balls 12 within the grooves 14 and thus limiting the amount of plunge of the inner member 10 of the joint relative to the outer member 11 in a direction towards the shaft 18. The configuration of the part 37 of the sealing member 28 is such that, when the inner member 10 of the propeller shaft assembly moves outwardly relative to its outer member 11 so that the balls 12 engage the resilient end stops constituted by said projecting portions 37, any further force tending to move the inner member outwardly relative to the outer member will be transmitted by engagement of the balls 12 with the resilient end stops to the plunging joint at the other end of the propeller shaft assembly resulting in movement of the outer member at that other end of the propeller shaft assembly away from the associated inner member.

At the other end of each groove 14, the extent of rolling movement of the balls 12 may be limited by providing an inwardly extending projection on or fixed to the end wall 16 though, as shown in the drawing, the extent of movement of the inner member 10 relative to the outer member, is prefeably limited by engagement of the resilient end stop 23 with the adjacent part of the end wall 16.

The tracks 14 and 15 which receive the balls 12 are so shaped that the balls 12 substantially fill the tracks constituted by the grooves 14 and 15. When, therefore, axial movement of the inner member 10 relative to the outer member 11 takes place there will be little if any flow of lubricant past the balls 12 from one side of the joint to the other. The lubricant is contained within an enclosure defined by the outer member 11 and its end wall 16, the sealing member 28 and the inner member 10 with its end stop 23.

The sealing member 28 is so shaped that, when axial movement takes place between the inner member and the outer member, the volume of that part of the enclosure beneath the balls 12 as viewed in FIG. 1 will remain substantially constant. When, therefore, the inner member 10 moves outwardly relative to the outer member 11, the pressure of the lubricant in that part of the enclosure beneath the balls 12 will be greater than the pressure of the lubricant in that part of the enclosure above the balls 12, the enclosure being completely or partly filled with the lubricant. The lubricant will thus act to tend to return the inner member 10 to its original position and will also act to damp plunging movement of the inner member 10 relative to the outer member 11.

When the inner member 10 moves inwardly relative to the outer member 11, the pressure of the lubricant in that part of the enclosure above the balls 12 will be increased and this increased pressure of the lubricant will, in effect, provide a restoring force acting to return the inner member 10 to its original position relative to the outer member 11.

The outer member 11 of each joint shown in FIG. 1 includes, integral with its end wall 16, a projecting cylindrical spigot portion 38 onto which an end portion of a tube 39 is fitted with the end portion of the tube 39 then welded onto this cylindrical portion 38 of the outer member 11. When, therefore, the propeller shaft assembly is in use the tube 39 will be free to move axially relative to both inner members 10 but movement thereof will be damped and a restoring force will be provided effectively centering the tube 39.

The universal joints at each end of the propeller shaft assembly shown in FIG. 2 are of the same basic form as the universal joints at each end of the propeller shaft assembly shown in FIG. 1 and the same reference numerals are used to denote those parts of the joints of FIG. 2 which are identical with corresponding parts of the joints of FIG. 1.

The outer member 40 of each joint shown in FIG. 2 differs slightly in configuration as compared with the outer member 11 shown in FIG. 1 in that, adjacent the end wall 16 thereof, the outer surface of the outer member 40 is formed with a circumferential groove 41 and, in those portions of the outer member 40 between adjacent grooves 14, troughs 42 are formed in the outer surface of the outer member 40, which troughs 42 intersect the groove 41.

A tube 43 has its end portion fitted around the outer member 40 so that the end face of the tube 43 will, in the assembled joint, abut the outer generally cylindrical portion 30 of the sealing member 28.

The end portion of the tube 43 is then deformed inwardly as by an electromagnetic pulse-forming process whereby the tube end portion is caused to have a mechanical interlocking engagement with the joint outer member 40.

After the outer member 11 of the joint shown in FIG. 1 has been secured to its tube 39 or after the outer member 40 of a joint shown in FIG. 2 has been secured to its tube 43, the inner member 10 and the cage 24 are assembled and the assembly comprising the inner member and cage is then inserted in the bore 13 of the outer member. The sealing member 28 is attached to the inner member 10, either before or after insertion of the inner member 10 in the bore 13 of the outer member, such securement being effected by means of the fastener shown in the drawing and the outer portion 30 of the sealing member 28 is then fitted over the end of the outer member and then secured thereto by means of the retaining sleeve 35 which is deformed, as by an electromagnetic pulse-forming process, so as to become either bonded to the outer member 11 of the joint shown in FIG. 1 or so as to become bonded to the tube 43 shown in FIG. 2 and so that the lip portion 36 thereof is pressed inwardly to urge the radial face of the portion 31 of the sealing member 28 into positive sealing engagement with the end face of the joint outer member. The joint is lubricated prior to final fastening of the sealing member 28.

A sealed joint is thus provided at the end of the propeller shaft tube and the connection of the joint to the drive shaft 18 is effected at the position at which the drive shaft 18 is located merely by causing the splined portion 19 of the drive shaft 18 to enter the splined bore 17 of the joint inner member 10 so that the spring clip 20 carried by the splined portion 19 of the drive shaft 18 becomes engaged in the increased diameter portion 21 of the bore in the inner member 10.

The tube 39 of the propeller shaft assembly shown in FIG. 1 is a single tube and the end portions of which are connected to the two outer members 11. The propeller shaft assembly shown in FIG. 2 includes, however, a pair of tubes 43, one secured to each joint outer member 40 with a further tube 44 interconnecting the two tubes 43 and with the tube 44 disposed in overlapping relation with the two tubes 43 and connected thereto for the transmission of drive therebetween by means of a plurality of elastomeric rings 45 which are located between the outer surface of each tube 43 and the inner surface of tube 44 and which are in compression between the associated tube surfaces. The elastomeric rings serve to transmit torque between the tubes 43 and the further tube 44 and act so as to permit limited rotation of the tube 44 relative to either tube 43 whereby the resilient rings 45 serve to damp any induced vibration of the tubes 43.

Although each inner member 10 is preferably formed with a splined bore for reception of a splined portion of the associated drive shaft, the inner member of one joint of each propeller shaft assembly may be formed integrally with its associated drive shaft and the drive shaft may, as shown, be formed with a flanged end plate 46 which is formed with apertures (not shown) to receive bolts for the bolting thereof to a flanged driving or driven shaft.

Alternatively each shaft 18 may have an externally splined end portion for reception in a splined bore of a driving or driven shaft. As a further alternative each shaft 18 may have an internally splined bore extending inwardly from the end face thereof for splined connection with the end part of a driving or driven shaft.

In the preferred arrangement a plunging constant velocity universal joint is provided at each end of the propeller shaft assembly, each joint preferably being of the form shown in patent specification No. 1,072,144. Alternatively, however, the joint at one end of the propeller shaft assembly may be a fixed centre joint, for example, the joint at one end of the propeller shaft assembly may be described in patent specification No. 810,289.

In order to prevent the entry of dust and dirt into the space between the sealing member 28 and the shaft 18, a collar or washer (not shown) can be fitted on the shaft 18.

The outer member of each joint may be either of one-piece construction as shown in the drawing or it may be formed from two parts which are subsequently welded together by a friction welding process. As a further alternative the outer member may be formed as two parts which are bolted together, a sealing member closing the inner end of the bore being clamped between opposed surfaces of the two parts of the outer member during bolting of the parts together.

When the outer member is of one-piece construction, it may be formed to the required shape either by extrusion or by electro-chemical machining. The electro-chemical machining process can be carried out using commercially available electro-chemical machining apparatus.

The propeller shaft assembly shown in FIG. 1 has the important advantage that, in installation thereof, it can be plugged in directly between the pinion shaft and the gearbox output shaft of a motor vehicle.

In a modification of the arrangement shown in FIG. 1 the part of the sealing means which abuts the balls to limit relative travel between the joint members is constituted by a metal or plastic washer fixed to the annular sealing member 28 in overlapping relation with the grooves 14.

In a further modification of the arrangeemnt shown in FIG. 1, the joint outer member is butt-welded to the end of the tube. In another modification the retaining sleeve which holds the sealing member in position is secured to the outer member by spot-welding.

In a modification of the arrrangement shown in FIG. 2, the tube means is constituted by a pair of tubes, one of larger diameter than the other with one tube secured to each joint outer member and the two tubes connected for the transmission of torque by elastomeric rings which fit between the tubes.

I claim:
1. A propeller shaft and universal joint assembly comprising:
   (a) tube means,
   (b) a universal joint at each end of said tube means including
      (i) an outer joint member which has an axially extending bore formed with axially extending grooves and is secured to said tube means, said member presenting a generally cylindrical circumferentially extending outer surface at the outer end of the joint,
      (ii) an inner joint member which has axially extending grooves in its outer face and means for connection thereto to a drive-line shaft, said member presenting a generally cylindrical circumferentially extending outer surface at the outer end of the joint,
      (iii) torque transmitting balls each disposed partly in one of said grooves of said outer member and one of said grooves of said inner member,
   and wherein said inner and outer members of at least one of said joints are movable axially relatively to each other, as well as angularly,
   (c) closure means for closing said bore of said outer member at an inner end of said bore, and
   (d) a sealing member of non-metallic resilient material associated with each joint at its outer end and having,
      (i) a generally cylindrical outer portion embracing said outer surface of the outer joint member,
      (ii) a generally cylindrical inner portion embracing said outer surface of the inner joint member, and
      (iii) an intermediate flexible wall portion integrally connected with said inner and outer portions so as to extend between said inner and outer members of the joint at its outer end to close the annular outer zone of said bore defined between said inner and outer members while leaving said means for connection to a drive-line shaft free for connection and disconnection of such shaft without removal of said sealing member
   said inner member of each of said joints including deflecting means for deflecting said inner portion of said sealing member in a direction radially outwardly with respect to the axis of rotation of said inner member.

2. An assembly according to claim 1 wherein the connection means for connection of at least one of said inner members to a drive-line shaft comprises an internally splined axially extending bore in said inner member.

3. An assembly according to claim 1 wherein said intermediate wall portion is of annular form and of C-shape in diametral cross section and is disposed with the concave face of the annular wall portion presented axially inwardly to the interior of the joint to which it is associated.

4. An assembly according to claim 1 wherein:
   (a) each of said outer members of said joints is received in a respective end portion of said tube means,
   (b) securing means are provided to hold said outer members in said end portion of said tube means.

5. An assembly according to claim 1 wherein each of said sealing members includes a stop part projecting radially inwardly at the junction of said outer portion and said intermediate wall portion, said stop part abutting the outer end face of said outer member of the joint with which said sealing member is associated, to limit travel of said balls along said grooves of said outer member and hence to limit the extent of relative axial movement between said inner and outer members of said joint.

6. An assembly according to claim 1 wherein:
   (a) said tube means comprises structurally separate tubes arranged end to end,
   (b) connection means for transmitting torque between said tubes and including elastomeric means providing for limited rotation of one tube relative to the other and for vibration damping is provided.

7. In a universal joint which includes an outer member having a bore which receives an inner member and in which balls are located in grooves in the inner and outer members for the transmission of torques therebetween, the grooves being so shaped as to permit relative axial movement between the inner and outer members and in which closure means are provided for closing one end of the bore in the outer member, the improvement in which:
   (a) a sealing member of resiliently deformable non-metallic material is provided,
   (b) said sealing member incorporates a flexible wall portion scanning said inner and outer members of the joint at the opposite end thereof from that at which said closure means are provided,
   (c) said sealing member further incorporates a locally thickened wall portion providing an inwardly projecting formation which presents a radially extending face disposed adjacent to one set of ends of said grooves so as to be situated in the path of travel of said balls therealong thereby to limit such travel and hence the extent of relative axial movement between said inner and outer members of said joint.

8. A universal joint according to claim 7 wherein the sealing member has an inner generally cylindrical portion attached to the inner member of the joint and an outer generally cylindrical portion attached to the outer member of the joint, said flexible wall portion serving integrally to connect said inner and outer portions, and wherein said formation extends radially inwardly from said wall portion at the junction thereof with said outer portion.

9. A universal joint according to claim 8 wherein the inner portion of the sealing member is fitted on a part of the inner member of the joint and in which deflecting means are provided adjacent the junction of said inner portion and said wall portion for deflecting said sealing member radially outwardly from the axis of rotation of the inner member.

10. A universal joint according to claim 8 in which the radially extending face of said formation is in engagement with an end face of said outer member of the joint at said set of ends of said grooves and in which retaining means are provided for securing said outer portion of said sealing member on said outer member of the joint and for urging said radially extending face into engagement with said end face of said outer member.

11. A universal joint according to claim 10 wherein the radially extending face of said formation overlaps said set of ends of said grooves in the outer member over the whole radial depth of said grooves.

References Cited

UNITED STATES PATENTS

| | | | |
|---|---|---|---|
| 2,510,362 | 6/1950 | Anderson | 64—8 |
| 3,367,139 | 2/1968 | Ristau | 64—21 |
| 3,452,558 | 7/1969 | Cull et al. | 64—32 R X |
| 3,017,756 | 1/1962 | Sharp | 64—21 |
| 3,603,111 | 9/1971 | Aucktor | 64—21 |
| 3,557,572 | 1/1971 | Aucktor et al. | 64—8 R |

WILLIAM F. O'DEA, Primary Examiner

W. C. ANDERSON, Assistant Examiner